United States Patent
Sakai

(10) Patent No.: US 8,919,219 B2
(45) Date of Patent: Dec. 30, 2014

(54) PRECISION TRANSFER EQUIPMENT

(75) Inventor: Hisayoshi Sakai, Kawasaki (JP)

(73) Assignee: Mitutoyo Corporation, Kanagawa (JP)

(*) Notice: Subject to any disclaimer, the term of this patent is extended or adjusted under 35 U.S.C. 154(b) by 317 days.

(21) Appl. No.: 13/612,972

(22) Filed: Sep. 13, 2012

(65) Prior Publication Data
US 2013/0068050 A1    Mar. 21, 2013

(30) Foreign Application Priority Data

Sep. 20, 2011 (JP) ................. 2011-205380

(51) Int. Cl.
*B23Q 5/44* (2006.01)
*B23Q 17/24* (2006.01)
*B23Q 1/25* (2006.01)
*F16C 29/02* (2006.01)

(52) U.S. Cl.
CPC ........ *B23Q 17/2428* (2013.01); *B23Q 17/2495* (2013.01); *B23Q 1/25* (2013.01); *F16C 29/025* (2013.01)
USPC ........... 74/490.09; 269/55; 356/486; 356/498

(58) Field of Classification Search
USPC .................. 74/490.09; 269/55; 356/486, 498; 403/31
See application file for complete search history.

(56) References Cited

U.S. PATENT DOCUMENTS

| | | | | |
|---|---|---|---|---|
| 4,160,328 A | * | 7/1979 | Ernst | ................................ 33/705 |
| 4,377,036 A | * | 3/1983 | Dangschat | ...................... 33/705 |
| 4,929,082 A | * | 5/1990 | Webber | .......................... 356/498 |
| 5,374,804 A | * | 12/1994 | Uchino et al. | ............ 219/121.78 |
| 5,839,324 A | * | 11/1998 | Hara | .......................... 74/490.09 |
| 5,940,180 A | * | 8/1999 | Ostby | ............................ 356/498 |
| 8,794,610 B2 | * | 8/2014 | Sakai | .............................. 269/55 |

FOREIGN PATENT DOCUMENTS

| | | |
|---|---|---|
| JP | 2000-055617 A | 2/2000 |
| JP | 2006-205292 A | 8/2006 |

OTHER PUBLICATIONS

U.S. Appl. No. 13/613,157 to Hisayoshi Sakai, which was filed Sep. 13, 2012.
U.S. Appl. No. 13/613,706 to Hisayoshi Sakai, which was filed Sep. 13, 2012.

* cited by examiner

*Primary Examiner* — William C Joyce
(74) *Attorney, Agent, or Firm* — Greenblum & Bernstein, P.L.C.

(57) ABSTRACT

A precision equipment having: a base; a table supported by the base; a tubular rod connected to a side of the table via a joint; a drive mechanism that moves the rod forward and backward; and a laser interferometer that detects displacement of the table relative to the base. The joint is provided by a supplying-discharging static-pressure joint and includes: a movement surface that is connected to the table and is orthogonal to a moving direction of the table; a drive surface that is connected to the rod and faces the movement surface; and a fluid supply channel supplying fluid to a static-pressure clearance between the movement surface and the drive surface. The laser interferometer includes a laser path having an optical axis along the moving direction passing through the inside of the rod of which a pressure is reduced and the drive surface and reflect on the movement surface.

4 Claims, 4 Drawing Sheets

PRECISION TRANSFER EQUIPMENT

The entire disclosure of Japanese Patent Application No. 2011-205380 filed Sep. 20, 2011 is expressly incorporated by reference herein.

BACKGROUND OF THE INVENTION

1. Field of the Invention

The present invention relates to precision transfer equipment, more specifically, equipment that transfers a work table or a column of measuring equipment and a machine tool with a high precision for positioning.

2. Description of Related Art

Precision transfer equipment requiring a high motion accuracy (e.g., a precision positioning system, precision measuring equipment and a machine tool) has been designed to directly reflect a profile accuracy of a precisely finished guide rail to motion accuracy of an object to be moved.

Such precision transfer equipment is required to transmit a thrusting force only in a predetermined feed direction without transmitting vibration and the like from a driving source for transmitting a driving force by a drive mechanism to a movable body such as a table (an object to be moved). One of such transmission mechanisms exhibiting excellent performance is a static-pressure joint that supplies fluid between a pair of highly precise planes to form a static-pressure clearance.

Especially, a supplying-discharging static-pressure bearing that supplies fluid in an outer periphery of the static-pressure clearance and discharges the fluid in the middle, or a vacuum-balanced static-pressure air bearing can provide a strong rigidity in a compression direction and a tensile direction. Thus, there has been proposed to use a drive mechanism using the static-pressure bearing having such a high rigidity to increase geometric accuracy of motion of a high precision linear table (see Patent Literature 1: JP-A-2006-205292).

According to Patent Literature 1, only the thrusting force is transmitted in non-contact from the rod (a driving body) to the table (the movable body) via a static-pressure air bearing, so that transmission of vibration from the driving source is avoidable and a high motion accuracy of the table is achievable. Further, by placing a thrusting axis from the rod near the centroid of the table, the motion accuracy of the table is maintainable even in driving for acceleration or deceleration.

The static-pressure joint disclosed in Patent Literature 1 further includes a thrust plate that is supported near the rod by a gimbal mechanism absorbing a motion error in a yawing direction and is supported near the table by a similar gimbal mechanism absorbing a motion error in a pitching direction. Through the joint, forces other than the force in the moving direction of the table are not transmitted.

In order for precision transfer equipment to enhance accuracy, it is crucial to accurately detect and control a position of the movable body in a feed direction, in addition to a high geometric accuracy of motion of the drive mechanism and the movable body.

In order to provide such a function, there has been known a technique for detecting a position of a movable body in a feed direction by setting a laser interferometer in the precision transfer equipment (see Patent Literature 2: JP-A-2000-55617).

According to Patent Literature 2, a slider driving mechanism using a feed screw axis is provided under a table and a position detecting mechanism using a laser interferometer is provided on a side of the table. In this arrangement, a laser path extending from a light source of the laser interferometer to an end of the table is surrounded by a stretchable tube with a bellows, in which an inner pressure of the tube is reduced to eliminate an influence from air turbulence in the laser path, thereby achieving further high precision.

A simple combination of the precision transfer equipment disclosed in Patent Literature 1 and the positioning detecting mechanism disclosed in Patent Literature 2 entails the following problems.

For a precise positioning by the precision transfer equipment of Patent Literature 1, it is desirable that an object to be precisely positioned is placed on a driving axis as well as on a laser optical axis (a measurement axis) of the laser interferometer. However, it is difficult to coaxially arrange the laser path of the laser interferometer of Patent Literature 2 and the driving axis by the rod and the static-pressure air bearing of Patent Literature 1, where so-called offset is inevitable.

For this reason, even if a high precision is achieved by the precision transfer equipment of Patent Literature 1, a highly precise positioning detecting mechanism by the laser interferometer as disclosed in Patent Literature 2 cannot be combined with the precision transfer equipment of Patent Literature 1, so that a highly precise movement and a highly precise positioning may not be sufficiently achieved in practical use.

Moreover, Patent Literature 2 discloses that the bellows is used for reducing the pressure in the laser path in order to eliminate an influence of a medium in the laser path, in which the end of the bellows needs to be hermetically connected to the table. Accordingly, even if deviation of the thrusting axis is resolved by the gimbal mechanism as disclosed in Patent Literature 1, a high precision may be impaired by being affected by the bellows.

SUMMARY OF THE INVENTION

An object of the invention is to provide precision transfer equipment that allows a highly precise movement and a highly precise positioning based on a highly precise position-detection.

According to an aspect of the invention, a precision transfer equipment includes: a base; a movable body that is supported by the base and is movable in a predetermined moving direction; a driving body that is connected to the movable body via a joint; a drive mechanism that moves the driving body forward and backward in the moving direction; and a displacement detector that detects a displacement of the movable body relative to the base, in which the joint is provided by a supplying-discharging static-pressure joint and includes: a movement surface that is connected to the movable body in a manner orthogonal to the moving direction; a drive surface that is connected to the driving body in a manner to face the movement surface; a fluid supply channel that supplies fluid into a static-pressure clearance formed between the movement surface and the drive surface; and a fluid discharge channel that discharges the fluid from the static-pressure clearance, and the displacement detector is provided by a laser interferometer having a laser path of which an optical path extends along the moving direction and is configured such that laser light passing through the laser path passes through the driving body and the drive surface and is reflected on the movement surface.

With this arrangement, when the drive mechanism drives the driving body, the movable body is moved via the driving body and the joint. When a supplying-discharging static-pressure joint is used as the joint, influences of vibration from the driving source is avoided and a highly precise movement is conducted by driving only in the moving direction.

The movement of the movable body is detected by a displacement detector. Since the displacement detector exhibits a high precision with the use of the laser interferometer and avoids an off-set error owing to the laser path passing through the driving body, the displacement detector can improve a positioning accuracy of the movable body.

In the above aspect of the invention, as the fluid used in the supplying-discharging static-pressure joint, not only air and other gases but also liquid is applicable. In the application of air, air is easily available and causes no problem in case air is leaked.

In the above aspect of the invention, as the driving mechanism, a driving mechanism including a power source (e.g., a motor) and a transmission mechanism for transmitting power to the driving body is applicable. A friction roller exhibiting a high consecutiveness in operation is desirable as such a transmission mechanism. However, other transmission mechanisms are usable.

In the above aspect of the invention, the driving body is desirably a tubular driving rod having an inside usable as the laser path, and a pressure of the inside is desirably reduced.

With this arrangement, by aligning the laser path with a position of the center axis of the driving rod, the moving axis of the driving body and the positioning detecting axis can be aligned with the moving direction of the movable body.

In the above aspect of the invention, the drive surface is desirably provided with a transparent plate that hermetically seals the laser path passing through the driving body from the static-pressure clearance and is inclined against an optical axis of the laser path.

With this arrangement, the pressure in the laser path within the driving body can be set to the reduced pressure irrespective of the air pressure in the static-pressure clearance. Accordingly, even when the pressure of the static-pressure clearance is high relative to the high vacuum required for the laser path, in other words, when the fluid is provided by gas having a high pressure, or when the fluid is provided by liquid, the fluid of the static-pressure clearance can be avoided from flowing into the laser path.

Herein, since the transparent plate is inclined against the optical axis, any unnecessary reflection light is not returned to the laser interferometer in the measurement using the laser interferometer.

In the aspect of the invention, it is not essential to provide the transparent plate for separating the static-pressure clearance from the laser path. For instance, when the pressure in the static-pressure clearance is sufficiently reduced, or when a vacuum degree of the laser path is low, the static-pressure clearance may be communicated with the laser path within the driving body.

DESCRIPTION OF EMBODIMENT(S)

Exemplary embodiment(s) of the invention will be described below with reference to the attached drawings.

First Exemplary Embodiment

Figure 1:
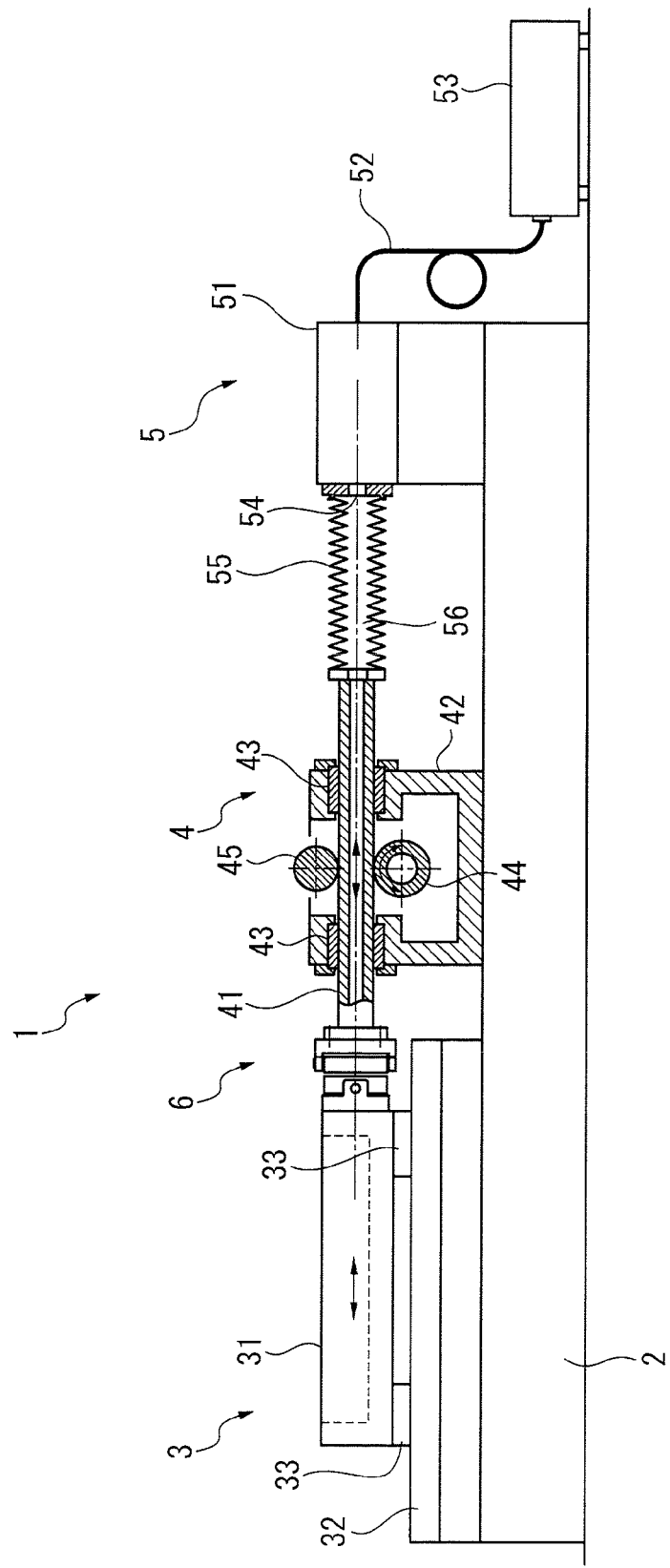
FIG. 1 is a schematic view showing an overall structure according to a first exemplary embodiment of the invention.
Figure 2:
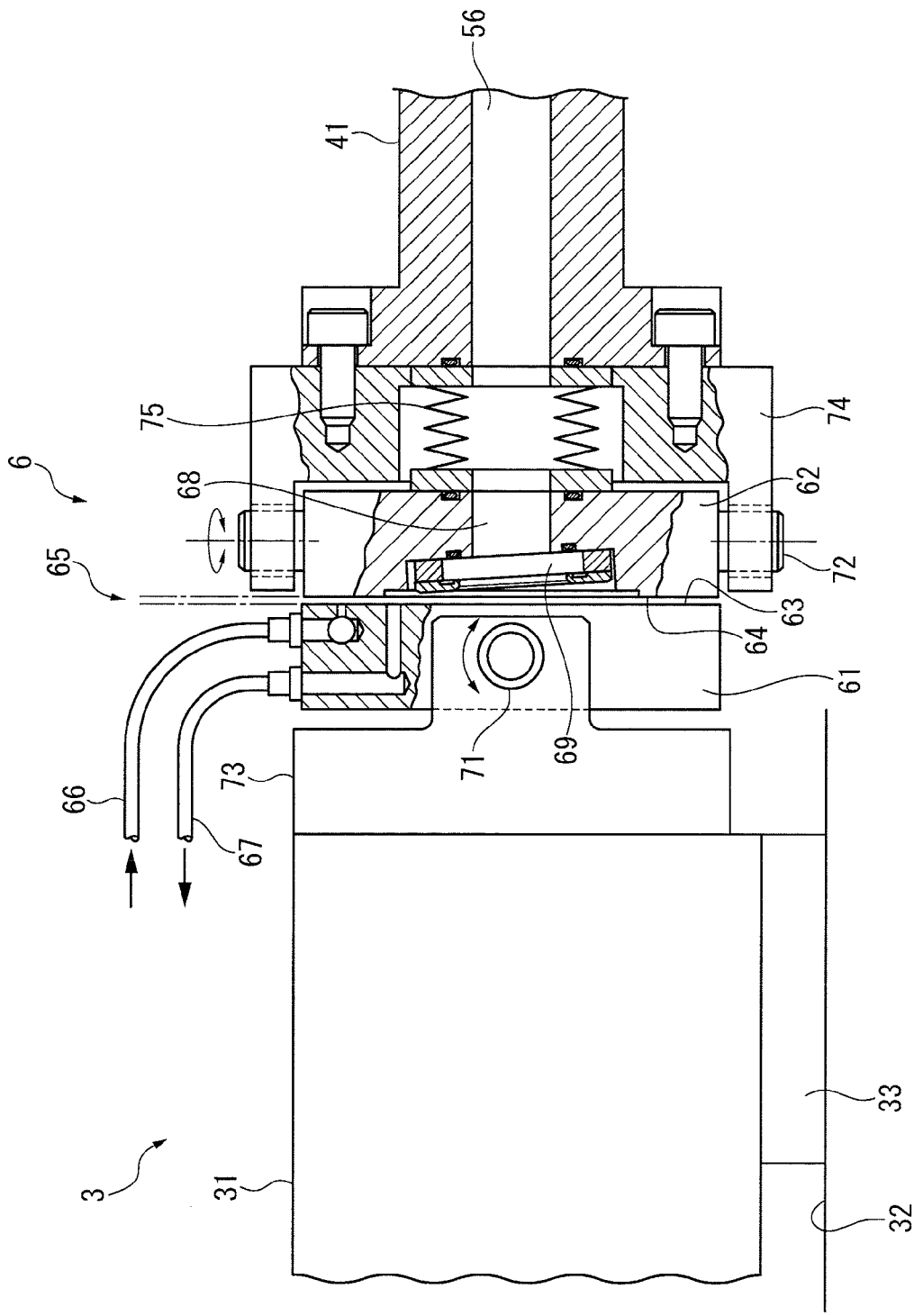
FIG. 2 is a cross-sectional view showing a relevant part according to the first exemplary embodiment.

FIGS. 1 and 2 show the first exemplary embodiment of the invention.

In FIG. 1, precision transfer equipment 1 according to the first exemplary embodiment includes: a base 2; and a table mechanism 3, a drive mechanism 4 and a laser interferometer 5 provided on the base 2.

The base 2 is fixed on a stable foundation while an upper surface of the base 2 is formed horizontal.

The table mechanism 3 supports a table 31 (a movable body) and includes a guide rail 32 that is fixed on the base 2.

A guide bearing 33 is provided on a bottom surface of the table 31. The table 31 is supported by the base 2 through the guide bearing 33 and the guide rail 32.

The guide rail 32 is continuously formed in a predetermined moving direction (in a predetermined direction for moving the table 31) while an upper surface of the guide rail 32 is made horizontal, flat and smooth.

The guide bearing 33 is a static-pressure air bearing that forms a static-pressure clearance between the upper surface of the guide rail 32 and the guide bearing 33 by supplying compressed air, and is preloaded with a load of the table 31.

The table 31 is movably supported by the table mechanism 3 and is smoothly movable in the above moving direction.

The drive mechanism 4 drives a rod 41 (a driving body) and includes a casing 42 that is fixed on the base 2.

The rod 41 is a hollow elongated tubular member that extends in the moving direction of the table 31. Both ends of the rod 41 (a base on the right and a tip end on the left in FIG. 1) project beyond the casing 42. The tip end of the rod 41 is connected to a side of the table 31 via a joint 6. The joint 6 will be described in detail later.

The casing 42 includes a rod guide 43 through which the rod 41 is introduced and which smoothly and slidably receives a circumference of the rod 41, the rod guide 43 being provided at two positions. By being supported by the rod guides 43, the rod 41 is kept supported in the moving direction of the table 31 and is freely movable in a longitudinal direction of the rod 41.

In the casing 42, a drive roller 44 and a follower roller 45 are provided in a manner to interpose the rod 41 therebetween.

The drive roller 44 is rotatable in reciprocal directions by receiving a rotation power transmitted from a power source such as a motor (not shown). When the drive roller 44 is pressed onto the circumference of the rod 41, the drive roller 44 is adapted to transmit the rotation power to the rod 41, thereby driving the rod 41 in the longitudinal direction.

The follower roller 45 is supported by the casing 42 in a freely rotatable manner and is pressed onto the rod 41 from a side opposite to the drive roller 44 to apply the pressing force to the rod 41, the pressing force being equivalent to a pressing force of the drive roller 44 against the rod 41. This arrangement prevents the rod 41 from being distorted or generating unnecessary forces in other directions.

With such a drive mechanism 4, the rod 41 can move forward or backward to any position in the longitudinal direction (moving direction) of the rod 41.

The laser interferometer 5 is a displacement detector of the invention and includes an interferometer body 51 that houses basic elements such as a light-receiving element and a splitter. An external laser source 53 is connected to the interferometer body 51 via an optical fiber 52.

An emitting portion 54 of the interferometer body 51 is connected to the base of the rod 41 via a metallic bellows 55. Although a distance between the rod 41 and the interferometer body 51 fluctuates since the rod 41 moves forward and backward in the longitudinal direction as described above, the connection between rod 41 and the interferometer body 51 is maintained by expansion and contraction of the bellows 55.

An inside of the bellows 55 and a hollow portion of the rod 41 intercommunicate with each other. Such a continuous space provides a laser path 56.

A laser light radiated from the emitting portion 54 passes through the laser path 56 to reach the joint 6 provided at the tip end of the rod 41, where the laser light is reflected. The reflected light passes through the laser path 56 to return to the interferometer body 51, where the laser light is received by the interferometer body 51.

In order to enhance measurement accuracy, an inner pressure of the laser path 56 is reduced to a high vacuum state. While being expansible and contractible in the longitudinal direction as the rod 41 moves, the bellows 55 securely has a predetermined rigidity in a radial direction by being made of metal. Accordingly, even if a difference between an internal air pressure and an external air pressure of the bellows 55 is large, the bellows 55 does not collapse.

In FIG. 2, the joint 6 connects the table 31 and the rod 41 and includes a movement member 61 that is connected to the table 31 and a drive member 62 that is connected to the tip end of the rod 41.

The movement member 61 and the drive member 62 are made of metal in a disc. One surface of each of the movement member 61 and the drive member 62 is polished so as to provide a highly precise flat surface. With this polishing, a movement surface 63 is formed on the surface of the movement member 61 and a drive surface 64 is formed on the surface of the drive member 62.

The movement member 61 is supported by a support member 73 via a horizontal turn shaft 71. The support member 73 is fixed on the side of the table 31. With this arrangement, a gimbal mechanism is formed on a side of the movable body, which allows the movement member 61 and the movement surface 63 to be slidable in a pitching direction.

The drive member 62 is supported by a support member 74 via a vertical turn shaft 72. The support member 74 is fixed on the tip end of the rod 41. With this arrangement, a gimbal mechanism is formed on a side of the driving body, which allows the drive member 62 and the drive surface 64 to be slidable in a yawing direction.

In the joint 6, the movement member 61 and the drive member 62 are disposed to face each other and a static-pressure clearance 65 is formed between the movement surface 63 and the drive surface 64 with a later-described fluid.

Usually, the table 31 is movable in a predetermined moving direction and the rod 41 also extends in the moving direction and is driven to move forward and backward in the moving direction. The turn shaft of the movement member 61 and the turn shaft of the drive member 62 are orthogonal to each other. The movement surface 63 and the drive surface 64 are usually orthogonal to the above moving direction of the table 31. Even if the rod 41 is slightly inclined against the moving direction of the table 31, such an inclination is absorbed by the above gimbal mechanisms on the respective sides of the moving and driving bodies, so that the above movement surface 63 and the drive surface 64 are kept orthogonal to the moving direction of the table 31.

To the movement member 61, a fluid supply channel 66 and a fluid discharge channel 67 are connected, whereby fluid is supplied to and discharged from the static-pressure clearance 65.

The fluid supply channel 66 supplies a compressed air (fluid) to the static-pressure clearance 65 through fluid restrictors provided at plural positions near the periphery of the movement surface 63.

The fluid discharge channel 67 discharges air from an area inside an area where the air is supplied near the periphery of the movement surface 63.

With this arrangement, the air supplied near the periphery of the static-pressure clearance 65 from the fluid supply channel 66 is partially released toward the atmosphere from the periphery of the static-pressure clearance 65 while the air in the inside area is discharged from the fluid discharge channel 67.

Accordingly, in the inside area where the air is discharged, a tensile force to make the movement surface 63 and the drive surface 64 approach each other is generated and serves as preload as a static-pressure joint. In the air supply area near the periphery, a compression force is applied on an air layer having a certain thickness, thereby providing a supplying-discharging static-pressure bearing.

A through hole 68 is formed at the center of the drive member 62.

A metallic bellows 75 is connected to the drive member 62 near the rod 41, specifically, connected to the periphery of an opening of the laser path 56 provided at the tip end of the rod 41.

With this arrangement, the laser path 56 inside the rod 41, an inside of the bellows 75 and the through hole 68 intercommunicate with each other along the axis of the moving direction of the table 31.

A glass transparent plate 69 is provided in the through hole 68 near the drive surface 64 and hermetically seals the inside of the through hole 68, the bellows 75 and the laser path 56 from the static-pressure clearance 65. The transparent plate 69 is transmissive of laser light from the laser interferometer 5. The laser light arriving through the laser path 56 is transmitted through the transparent plate 69 and is reflected by the movement surface 63 to be again transmitted through the transparent plate 69 to return to the laser path 56, where the laser light is detected by the laser interferometer 5.

In this arrangement, since the movement surface 63 is kept orthogonal to the moving direction of the table 31 (i.e., an optical axis of the laser light passing through the laser path 56), the movement surface 63 can reliably reflect the laser light from the laser path 56.

On the other hand, when the transparent plate 69 is fixed in the through hole 68, the transparent plate 69 is not orthogonal to the moving direction of the table 31 (i.e., the optical axis of the laser light passing through the laser path 56), but the transparent plate 69 is fixed so as to be slightly angularly-inclined against the optical axis of the laser light. With this arrangement, any reflected components generated on the transparent plate 69 are deviated from the optical axis of the laser light and never return to the laser interferometer 5.

According to this exemplary embodiment, driving the rod 41 by the drive mechanism 4 enables moving of the table 31 through the rod 41 and the joint 6.

In the exemplary embodiment, since the joint 6 is provided by a supplying-discharging static-pressure joint, influences (e.g., vibration) from a power source (e.g., a motor) of the drive mechanism 4 can be avoided and a highly precise movement can be conducted by driving only in the moving direction of the table 31.

The movement of the table 31 is able to be detected by the laser interferometer 5 (a displacement detector). The laser interferometer 5 exhibits a high precision with the use of laser interference. In addition, since the laser interferometer 5 is provided with the laser path 56 passing through the rod 41, the laser interferometer 5 can align a moving axis of the rod 41 and a position-detecting axis of the laser light with the moving direction of the table 31, thereby avoiding an off-set error. Accordingly, an advanced positioning accuracy for the table 31 can be realized.

Since the drive surface 64 is provided with the transparent plate 69 that hermetically seals the laser path 56 passing through from the inside of the rod 41 to the through hole 68 from the static-pressure clearance 65, the pressure in the laser path 56 can be set at a reduced pressure irrespective of the air pressure of the static-pressure clearance 65. Accordingly, even when the pressure of the static-pressure clearance 65 is high relative to the high vacuum required for the laser path 56, the fluid of the static-pressure clearance 65 can be kept from flowing into the laser path 56.

Since the transparent plate 69 is inclined against the optical axis of the laser light passing through the laser path 56, any unnecessary reflection light is not returned to the laser interferometer 5 in the measurement using the laser interferometer 5.

Second Exemplary Embodiment

Figure 3:
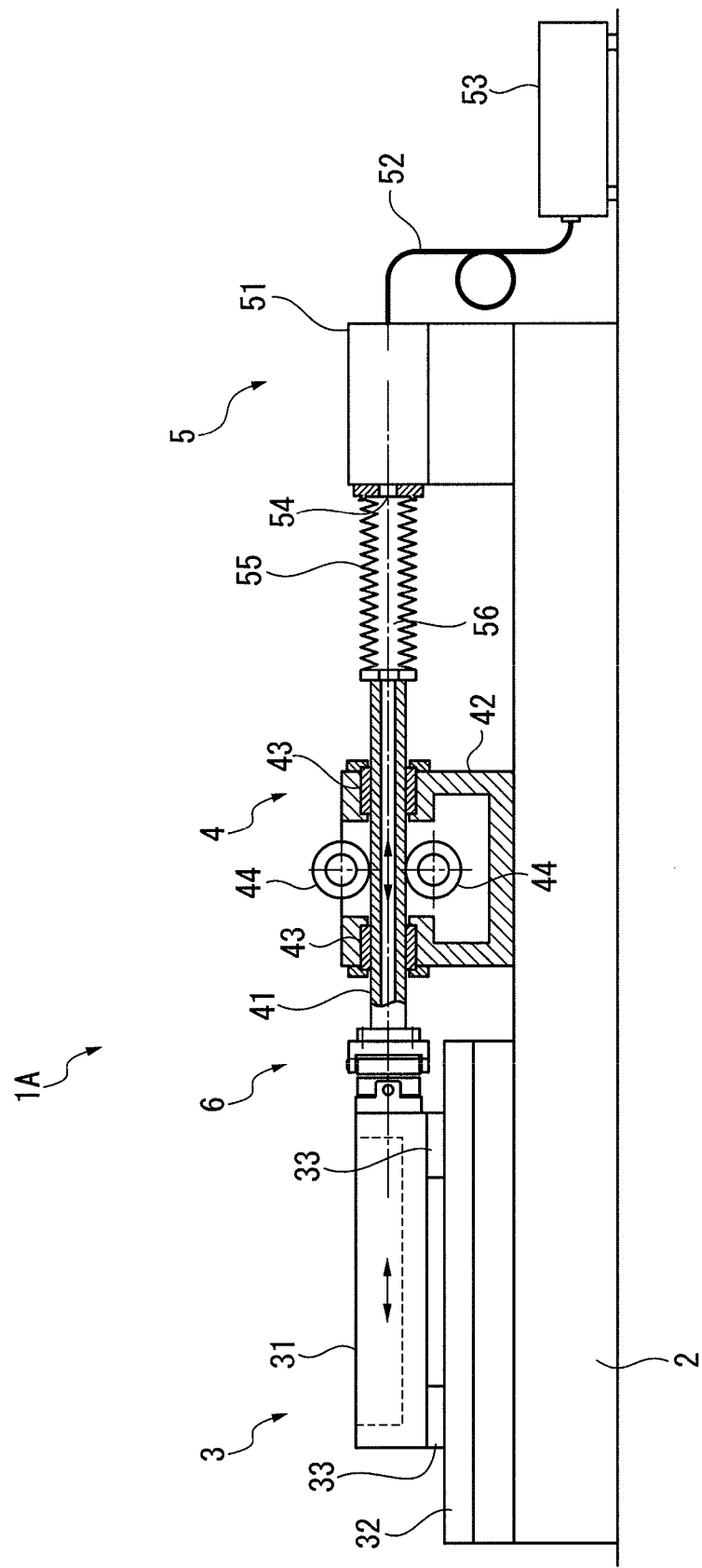
FIG. 3 is a schematic view showing an overall structure according to a second exemplary embodiment of the invention.

FIG. 3 shows a second exemplary embodiment of the invention.

In FIG. 3, precision transfer equipment 1A according to the second exemplary embodiment includes: the base 2; and the table mechanism 3, the drive mechanism 4 and the laser interferometer 5 provided on the base 2.

The above components other than the drive mechanism 4 are the same as those in the precision transfer equipment 1 according to the first exemplary embodiment and are given with the same reference numerals in which overlapping description of the components will be omitted.

The drive mechanism 4 includes the casing 42, the rod guide 43 and the drive roller 44 in order to drive the rod 41. Herein, the rod 41, the casing 42 and the rod guide 43 are the same as those in the precision transfer equipment 1 according to the first exemplary embodiment and are given with the same reference numerals in which overlapping description of the components will be omitted.

The drive mechanism 4 is different from the precision transfer equipment 1 according to the first exemplary embodiment in that the follower roller 45 is omitted and a pair of drive rollers 44 are disposed to face each other.

The pair of drive rollers 44 are configured to evenly receive a driving force from a power source (not shown) through a transmitting mechanism and rotate at the same speed.

According to the exemplary embodiment, in addition to the same advantages as those of the first exemplary embodiment, since the pair of the drive rollers 44 interpose the rod 41 therebetween to uniformly drive the rod 41, the moving axis of the rod 41 and the detecting axis of the laser light can be aligned with a driving axis (i.e., a thrusting axis) at the center of a driving force (i.e., thrusting force) as well as being aligned with the moving direction of the table 31, so that a further high precision can be expected.

Third Exemplary Embodiment

Figure 4:
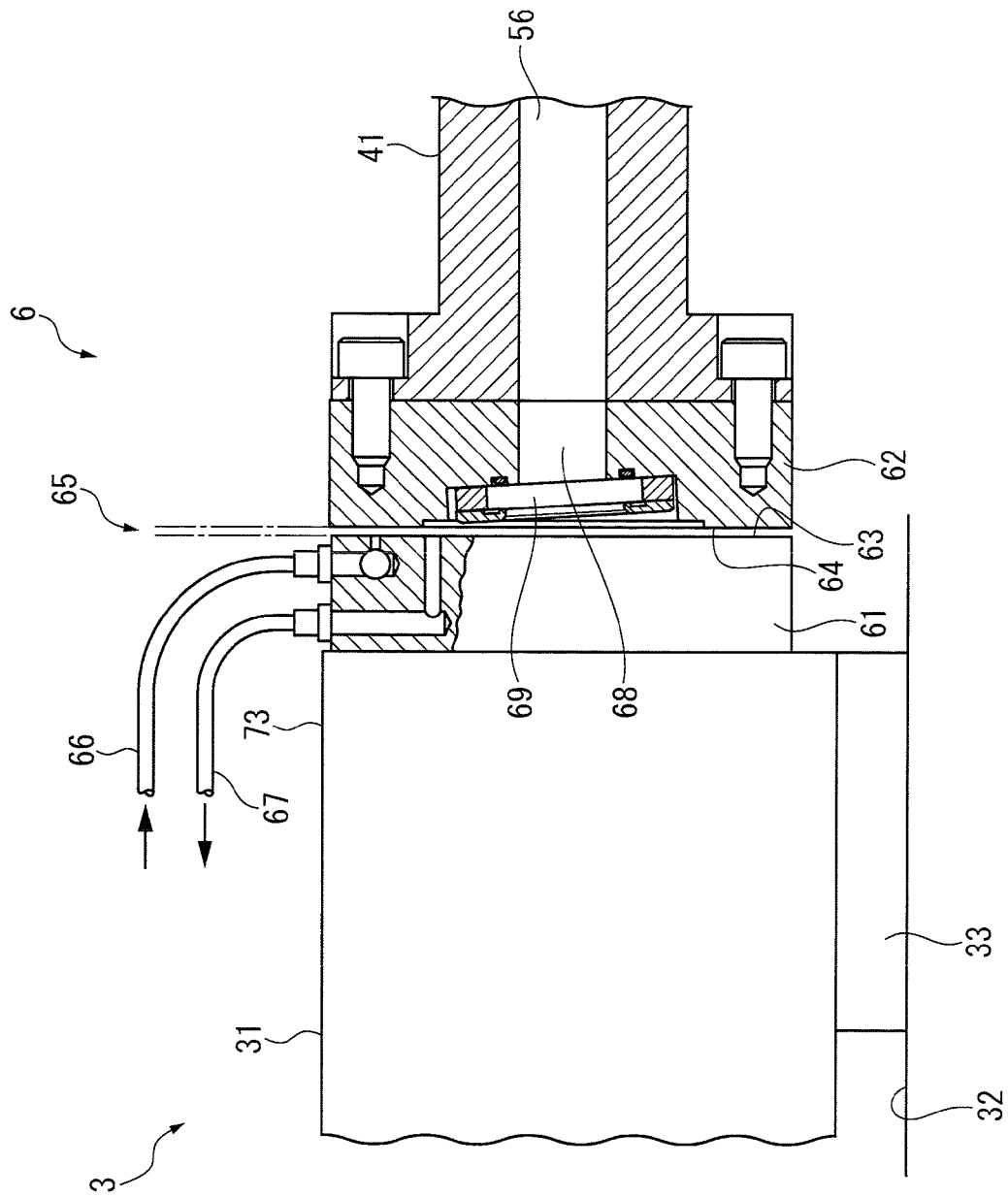
FIG. 4 is a cross-sectional view showing a relevant part according to a third exemplary embodiment of the invention.

FIG. 4 shows a third exemplary embodiment of the invention.

Precision transfer equipment according to the third exemplary embodiment is basically the same as the above-described precision transfer equipment 1 according to the first exemplary embodiment, in which only the joint 6 is different. Accordingly, the same components as those in the precision transfer equipment 1 according to the first exemplary embodiment are given with the same reference numerals in which overlapping description of the components will be omitted. The joint 6 having a different structure will be described below.

In FIG. 4, the joint 6 includes the movement member 61, the drive member 62, the movement surface 63, the drive surface 64, the static-pressure clearance 65, the fluid supply channel 66, the fluid discharge channel 67, the through hole 68 and the transparent plate 69 in the same manner as in the first exemplary embodiment.

However, the gimbal mechanisms for supporting the movement member 61 and the drive member 62 are omitted. The movement member 61 and the drive member 62 are directly fixed on the side of the table 31 and the tip end of the rod 41, respectively.

Although the third exemplary embodiment does not provide an advantage of the gimbal mechanism for resolving an inclination, the other advantages are the same as those in the first exemplary embodiment. In contrast, when the rod 41 is less likely to be inclined, the structure of the joint 6 can be significantly simplified according to the third exemplary embodiment.

Modification(s)

The invention is not limited to the exemplary embodiments as described above, but may include any modification or improvement as long as an object of the invention can be achieved.

For instance, it is not essential to provide the transparent plate 69 for separating the static-pressure clearance 65 from the laser path 56. For instance, when a pressure in the static-pressure clearance 65 is sufficiently reduced, or when a vacuum degree of the laser path 56 is low, the static-pressure clearance 65 may be communicated with the laser path 56.

The drive mechanism 4 is not limited to friction rolling by the drive roller 44, but may employ a feed-screw-axis mechanism and the like.

The bellows 55 between the drive mechanism 4 and the laser interferometer 5 may be replaced by a telescopic structure and the like.

In the above exemplary embodiments, the moving direction of the table 31 is described in one dimension. However, the table 31 may be moved in two dimensions in combination of two drive systems.

What is claimed is:

1. A precision transfer equipment comprising:
a base;
a movable body that is supported by the base and is movable in a predetermined moving direction;
a driving body that is connected to the movable body via a joint;
a drive mechanism that moves the driving body forward and backward in the moving direction; and
a displacement detector that detects a displacement of the movable body relative to the base, wherein
the joint is provided by a supplying-discharging static-pressure joint and comprises: a movement surface that is connected to the movable body in a manner orthogonal to the moving direction; a drive surface that is connected to the driving body in a manner to face the movement surface; a fluid supply channel that supplies fluid into a static-pressure clearance formed between the movement surface and the drive surface; and a fluid discharge channel that discharges the fluid from the static-pressure clearance, and
the displacement detector is provided by a laser interferometer having a laser path of which an optical path extends along the moving direction and is configured such that laser light passing through the laser path passes through the driving body and the drive surface and is reflected on the movement surface.

2. The precision transfer equipment according to claim 1, wherein the driving body is a tubular driving rod having an inside usable as the laser path, and a pressure of the inside is reduced.

3. The precision transfer equipment according to claim 1, wherein the drive surface is provided with a transparent plate that hermetically seals the laser path passing through the driving body from the static-pressure clearance and is inclined against an optical axis of the laser path.

4. The precision transfer equipment according to claim 2, wherein the drive surface is provided with a transparent plate that hermetically seals the laser path passing through the driving body from the static-pressure clearance and is inclined against an optical axis of the laser path.

* * * * *